(12) United States Patent
Guo

(10) Patent No.: US 9,173,132 B2
(45) Date of Patent: Oct. 27, 2015

(54) METHOD AND APPARATUS FOR CONFIGURING COMMUNICATION RESOURCE SETS AND METHOD AND SYSTEM OF RESOURCE MANAGEMENT

(75) Inventor: Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 13/816,285

(22) PCT Filed: Sep. 9, 2011

(86) PCT No.: PCT/CN2011/079532
§ 371 (c)(1),
(2), (4) Date: Feb. 11, 2013

(87) PCT Pub. No.: WO2012/041160
PCT Pub. Date: Apr. 5, 2012

(65) Prior Publication Data
US 2013/0136101 A1    May 30, 2013

(30) Foreign Application Priority Data
Sep. 30, 2010  (CN) .......................... 2010 1 0514986

(51) Int. Cl.
*H04W 4/00* (2009.01)
*H04W 28/18* (2009.01)
*H04W 72/06* (2009.01)
*H04W 72/10* (2009.01)

(52) U.S. Cl.
CPC ............. *H04W 28/18* (2013.01); *H04W 72/06* (2013.01); *H04W 72/10* (2013.01)

(58) Field of Classification Search
CPC ............................ H04W 28/18; H04W 72/06
USPC .................. 370/328, 329, 330, 252, 253, 254
See application file for complete search history.

(56) References Cited

U.S. PATENT DOCUMENTS

| 7,391,780 | B1* | 6/2008 | Stone et al. ............. 370/395.41 |
| 8,509,233 | B2* | 8/2013 | Yao et al. ....................... 370/390 |
| 2007/0081449 | A1* | 4/2007 | Khan ............................ 370/208 |
| 2008/0069082 | A1* | 3/2008 | Patrick ......................... 370/351 |

(Continued)

FOREIGN PATENT DOCUMENTS

| CN | 1568032 | 1/2005 |
| CN | 101568125 | 10/2009 |

(Continued)

OTHER PUBLICATIONS

International Search Report Issued Dec. 1, 2011 in PCT/CN11/79532 Filed Sep. 9, 2011.

*Primary Examiner* — Chuong T Ho
(74) *Attorney, Agent, or Firm* — Oblon, McClelland, Maier & Neustadt, L.L.P.

(57) ABSTRACT

A method for configuring a wireless communication resource set, a resource set configuration apparatus, a method and system of wireless communication resource management, and a base station with the system of wireless communication resource management are provided, wherein the method for configuring wireless communication resource sets includes: ordering the resource sets according to the preset mode; dividing the ordered resource sets into segments, wherein the segments include segments with different types and different functions; and further dividing the segments into sections, wherein every section is used for a corresponding type of service.

18 Claims, 11 Drawing Sheets

(56) References Cited

U.S. PATENT DOCUMENTS

| | | | |
|---|---|---|---|
| 2008/0069124 A1* | 3/2008 | Patrick | 370/401 |
| 2009/0183168 A1* | 7/2009 | Uchida | 718/104 |
| 2010/0054198 A1 | 3/2010 | Sung et al. | |
| 2010/0098066 A1* | 4/2010 | Croak et al. | 370/352 |
| 2011/0128956 A1* | 6/2011 | Yao et al. | 370/390 |
| 2013/0064110 A1* | 3/2013 | Polinati et al. | 370/252 |

FOREIGN PATENT DOCUMENTS

| | | |
|---|---|---|
| CN | 101572918 | 11/2009 |
| CN | 101801091 | 8/2010 |

\* cited by examiner

METHOD AND APPARATUS FOR CONFIGURING COMMUNICATION RESOURCE SETS AND METHOD AND SYSTEM OF RESOURCE MANAGEMENT

FIELD OF THE INVENTION

The present invention relates to the field of wireless communication and in particular to a method and resource set configuring apparatus for configuring a wireless communication resource set, a method of and system for managing wireless communication resources and a base station including the system for managing wireless communication resources.

BACKGROUND OF THE INVENTION

Global information networks are evolving rapidly toward Internet Protocol (IP)-based Next Generation Networks (NGNs) along with the dramatic development of computer and communication technologies. This means that wireless networks can provide various organizations or users with more abundant wireless services. Demands of these services for wireless resources are diversified greatly due to their different natures and contents. This diversity will be more apparent especially in a heterogeneous wireless-access network environment formed under coexist of various types of wireless technologies. At this time, there arises a high requirement on management of wireless communication resources.

SUMMARY OF THE INVENTION

An object of the invention is to provide a method of and resource set configuring apparatus for configuring a set of wireless communication resources, a method of and system for managing wireless communication resources and a base station including the system for managing wireless communication resources. The following is a summary of the invention to facilitate a basic understanding of some aspects of the invention. However it shall be appreciated that this summary is not an exhaustive overview of the invention, and it is intended neither to identify certain crucial or important elements of the invention nor to define the scope of the invention. Rather, the purpose of the summary is to present some concepts of the invention in a simplified form as a preamble of the more detailed description to be presented hereinafter.

In an embodiment of the invention, there is proposed a method for configuring a set of wireless communication resources, comprising: sorting a set of resources in a preset mode; dividing the sorted set of resources into segments, wherein the segments comprise segments of different types and with different functions; and further dividing the segments into sections, wherein each section is used for a corresponding type of service.

In another embodiment of the invention, there is proposed a resource set configuring apparatus for configuring a set of wireless communication resources, comprising: sorting means configured to sort a set of resources in a preset mode; segmenting means configured to divide the sorted set of resources into segments, wherein the segments comprise segments of different types and with different functions; and sectioning means configured to further divide the segments into sections, wherein each section is used for a corresponding type of service.

In another embodiment of the invention, there is proposed a method for managing wireless communication resources, which includes: a resource planning step for: performing the method for configuring a set of wireless communication resources described above when a status bit indicating a configuration condition of system resources is at an initial status value, adjusting the set of resources according to a given adjusted admission decision result when the status bit is at a second status value, and cleaning up the set of resources comprehensively to reduce resource fragments when the status bit is at a third status value; an admission controlling step for determining whether a bandwidth required by a new resource allocation request can be satisfied, and if so, allowing access of services corresponding to the resource allocation request; otherwise, rejecting the access of the services; and a resource allocating step for allocating corresponding resources to the admitted services according to bandwidth demands of the services.

In another embodiment of the invention, there is proposed a system resource planning means configure to plan a set of wireless communication resources according to a status bit indicating a configuration condition of system resources; admission controlling means configure to determine whether a bandwidth required by a new resource allocation request can be satisfied, and if so, allowing access of services corresponding to the resource allocation request; otherwise, rejecting the access of the services; and resource allocating means configure to allocate corresponding resources to the admitted services dependent upon the bandwidth demands; wherein the resource planning means comprises resource set configuring means and resource set adjusting means, the resource set configuring means is configured to divide the set of wireless communication resources when the status bit is at an initial status value and comprises sorting means, segmenting means and sectioning means, wherein the sorting means is configured to sort the set of resources in a preset mode, the segmenting means is configured to divide the sorted set of resources into segments, the segments comprising segments of different types and with different functions, and the sectioning means is configured to further divide the segments into sections, each section being used for a corresponding type of service, and the set of resources adjusting means is configured to adjust the set of resources according to a given adjusted admission decision result when the status bit is at a second status value and to clean up the set of resources comprehensively to reduce resource fragments when the status bit is at a third status value.

In another embodiment of the invention, there is proposed a base station including the resource managing system as described above.

Furthermore an embodiment of the invention further provides a computer program for performing the methods.

Moreover an embodiment of the invention further provides a computer program product at least in the form of a computer readable medium on which codes of the computer program for performing the methods are recorded.

With the embodiments of the invention, wireless resources can be managed and allocated flexibly to satisfy a bandwidth demand of a user. Furthermore in the embodiments of the invention, the configuration of a set of resources can be dynamically variable to prevent some resource from being occupied by some type of service to thereby further ensure fair allocation of the resources and also improve the probability of availability of a resource to a service to thereby use effectively utilize the resources.

These and other advantages of the invention will become more apparent from the following detailed description of preferred embodiments of the invention with reference to the drawings.

BRIEF DESCRIPTION OF THE DRAWINGS

The invention can be better understood with reference to the detailed description given below in conjunction with the accompanying drawings together with which the following detailed description is incorporated into and forms a part of this specification and serves to further illustrate preferred embodiments of the invention and to explain the principle and advantages of the invention. In the drawings:

FIG. 10(a) to FIG. 10(f) depict all possible direction settings of allocated segments and reserved segments.

In the drawings, identical or corresponding method steps or components are denoted with identical or corresponding reference numerals.

DETAILED DESCRIPTION OF THE INVENTION

Figure 1:
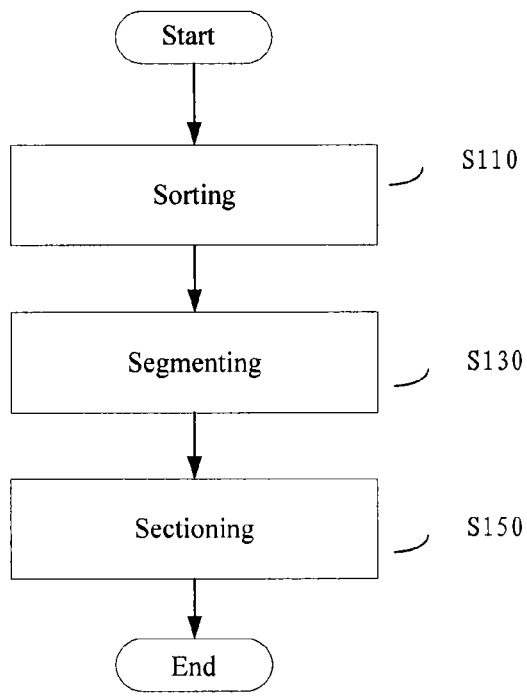
FIG. 1 illustrates a flow chart of a method for configuring a set of radio communication resources according to an embodiment of the invention.

Exemplary embodiments of the present invention will be described below in conjunction with the accompanying drawings. For the sake of clarity and conciseness, not all the features of practical implementations have been described in the specification. However it shall be appreciated that during developing of any such practical implementations, numerous decisions specific to the implementation shall be made to achieve developer's specific goals, and these decisions may vary from one implementation to another. Moreover it shall also be appreciated that such a development effort might be very complex and time-consuming but may simply be a routine task for those skilled in the art benefiting from this disclosure.

It shall further be noted that only those apparatus structures closely relevant to the solutions of the invention will be illustrated in the drawings while omitting other details less relevant to the invention so as to avoid obscuring the invention due to those unnecessary details.

The inventors have realized that one of goals to effectively utilize wireless resources is to utilize them as sufficient as possible, but with the development of wireless communication technologies, it becomes difficult to make full use of the resources due to the diversity of network types and service types. Thus it is desirable to design an effective resource management solution for a wireless network in which various types of networks or services coexist, where wireless resources can be managed flexibly and allocated to satisfy a bandwidth demand of a user and further ensure fair allocation of the resources and also improve the probability for services to obtain resources, so as to effectively utilize the resources.

Thus there is proposed according to an embodiment of the invention a method for configuring a set of wireless communication resources. FIG. 1 illustrates a flow chart of a method for configuring a set of wireless communication resources according to an embodiment of the invention. As can be apparent from FIG. 1, this method includes the following steps:

The step S110 is to sort a set of resources in a preset mode. The set of resources here refers to a set of resources available to wireless communication, e.g., spectrum resources, timeslot resources, time-frequency block resources, etc. In the step S110, sorting can be performed in at least one of the following patterns: spectrum resources can be sorted in an ascending order of available frequencies; timeslot resources can be sorted in a temporal order; and time-frequency block resources can be sorted firstly in an ascending order of frequencies and then in an order of timeslots, or on the contrary, firstly in an order of timeslots and then in an ascending order of frequencies. Of course those skilled in the art can alternatively design any sorting patterns as needed, which will not be enumerated here.

Figure 2:
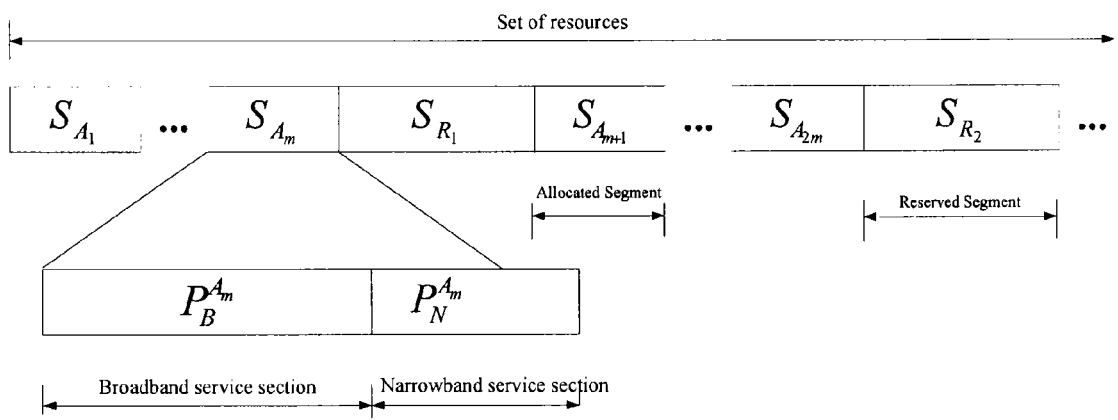
FIG. 2 illustrates a schematic diagram of dividing a set of resources.

The step S130 is to divide the sorted set of resources into several sub-units, each of which is referred to a segment, where the segments include segments of different types and with different functions. FIG. 2 illustrates a schematic diagram of dividing the set of resource. As can be seen from FIG. 2, the set of resources can be divided, for example, into two types of segments: allocated segments $S_{A_i}$, i∈N configured to satisfy a bandwidth demand of a normal service; and reserved segments $S_{R_j}$, j∈N configured to ensure access of some special services (e.g., a service at a high priority) or to be used as a buffer area in adjusting the set of resources. In order to further improve the fairness of resource configuration, the allocated segments and the reserved segments are preferably designed to exist alternately. For example, a resource at a high frequency is more susceptible to be interfered with than a resource at a low frequency, so the fairness of resource configuration can be further improved by designing the allocated segments and the reserved segments to exist alternately.

The step S150 is to further divide the segments into several sub-units, each of which is referred to as a section. Each section is responsible for a corresponding type of service. FIG. 2 illustrates an exemplary scenario where an allocated segment is divided into two types of sections, i.e., a broadband service sections $P_B^{A_i}$ and a narrowband service sections $P_N^{A_i}$, and none of the reserved segments is divided into sections. Of course those skilled in the art can alternatively divide the segments into sections correspondingly as needed in practice.

The numbers and locations of the allocated segments and the reserved segments, the sizes of the respective segments and the sizes of the respective sections can be determined according to a service condition of a practical system and can vary dynamically with a varying service demand. A general principle is to design an effective resource allocation strategy based upon the segmentation and sectioning where waste of resources is reduced (that is, the amount of a remaining resource which can not satisfy a new service demand is reduced) in allocation as much as possible, making it easy to adjust the set of resources. Furthermore, based upon the foregoing divisions, the segments can be re-planned in the operation of a network by segment merging (of merging adjacent segments into a segment), segment splitting (of splitting a large segment into several segments) and other operations to thereby make it more convenient to allocate the resources and improve the utilization ratio of the resources.

Possible segmentation and sectioning modes according to an implementation of the invention will be described below.

1) The ratio of the allocated resources for the allocated segments to the reserved resources for the reserved segments is determined: the ratio is determined according to the total capacity of the set of resources, arrival rates and average bandwidths of respective services, requirement of the respective services for admission rates and a resource allocation principle, where the resource allocation principle can be determined according to a specific network condition and the resource allocation strategy, which will not be further discussed here.

2) The sizes of the allocated segments and the reserved segments are determined: a specific number of service types to be satisfied by each segment can be specified, then the size of the section can be calculated from average bandwidths of these services, next the sizes of the other sections can be calculated from ratios determined in the following rule 4), and finally the sizes of these sections are summed as the size of each segment. Alternatively a specific value can be specified randomly as the size of a segment, and the segments can be merged and split in the operation of the network according to the utilization ratio of the resources thereof to gradually derive a preferred size of a segment. After the size of a segment is derived, the numbers of the respective types of segments can be determined from the total amount of the resources of the respective types of segments.

3) Relative locations of the allocated segments and the reserved segments are determined: these relative locations are determined from the numbers of the allocated segments and the reserved segments. Preferably, the allocated segments and the reserved segments are distributed uniformly, that is, a reserved segment is arranged after several allocated segments to thereby ensure the fairness of resource configuration.

4) The proportions of respective sections in an allocated segment are determined: the proportions of the respective sections can be determined from arrival rates and average bandwidths of services. Specifically the proportions of the sizes of the respective sections can be determined from the products of the arrival rates and the average bandwidths of the respective services.

With the method for configuring wireless communication resource set according to the embodiment of the invention, the set of wireless communication resource can be managed and allocated flexibly to thereby effectively utilize the resources.

Figure 3:
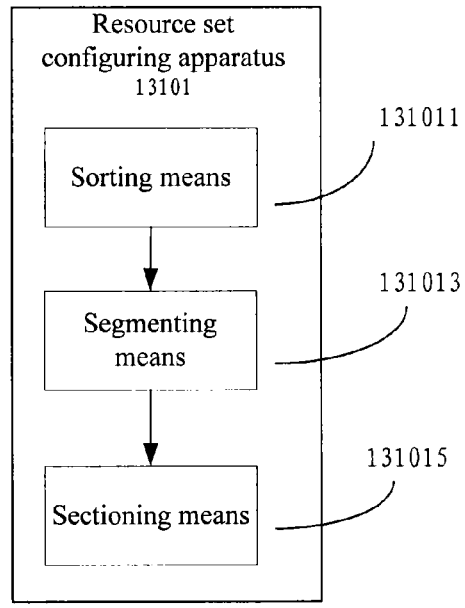
FIG. 3 illustrates a schematic structural diagram of the set of resources configuring apparatus.

According to another embodiment of the invention, there is proposed a resource set configuring apparatus for configuring a wireless communication resource set. FIG. 3 illustrates a schematic structural diagram of the resource set configuring apparatus. As can be seen from FIG. 3, the resource set configuring apparatus 13101 includes: sorting means 131011 configured to sort a set of resources in a preset mode; segmenting means 131013 configured to divide the sorted set of resources into segments, where the segments can include segments of different types and with different functions; and sectioning means 131015 configured to further divide the segments into sections, where each section is used for a corresponding type of service.

Particularly the segments include allocated segments and reserved segments, where the allocated segments are configured to satisfy a bandwidth demand of a normal service, and the reserved segments are configured ensure access of a service at a high priority or to be used as a buffer area in adjusting the set of resources, and where the allocated segments and the reserved segments exist alternately.

Particularly the sorting means 131011 is configured to perform at least one of the following processes: spectrum resources are sorted in an ascending order of available frequencies; timeslot resources are sorted in a temporal order; and time-frequency block resources are sorted firstly in an ascending order of frequencies and then in an order of timeslots or firstly in an order of timeslots and then in an ascending order of frequencies. Of course those skilled in the art can alternatively design any sorting patterns as needed, which will not be enumerated here.

Reference can be made to the corresponding part of the method embodiment above for particularly how the set of resources configuring apparatus 13101 operates, and a description thereof will be omitted here.

Figure 4:
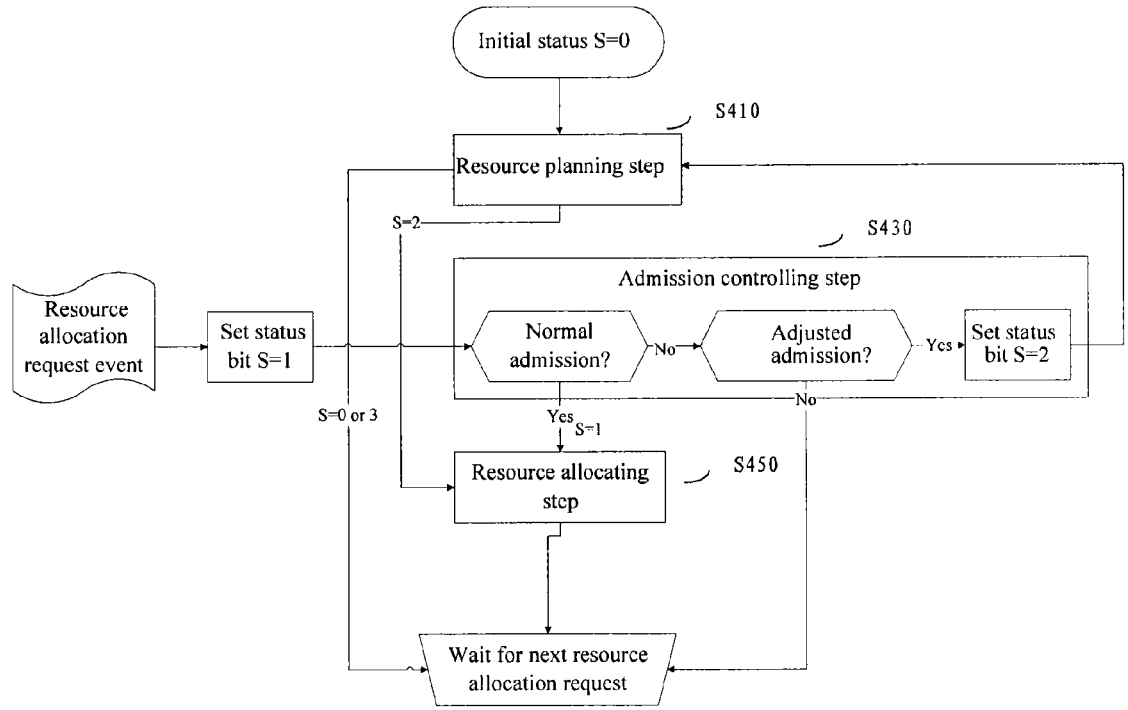
FIG. 4 illustrates a schematic flow chart of a method for managing wireless communication resources according to an embodiment of the invention.

With the method of dividing a set of wireless communication resources according to the embodiment of the invention described above, the set of wireless communication resources can be managed and allocated flexibly to thereby effectively utilize the resources. Thus according to an embodiment of the invention, there is proposed a method of managing wireless communication resources. FIG. 4 illustrates a schematic flow chart of a method of managing wireless communication resources according to an embodiment of the invention. As can be seen from the figure, this method includes the following steps:

The step S410 is a resource planning step of planning a set of resources to provide a specification in allocating resources to respective networks or services to thereby make full use of the resources.

Figure 5:
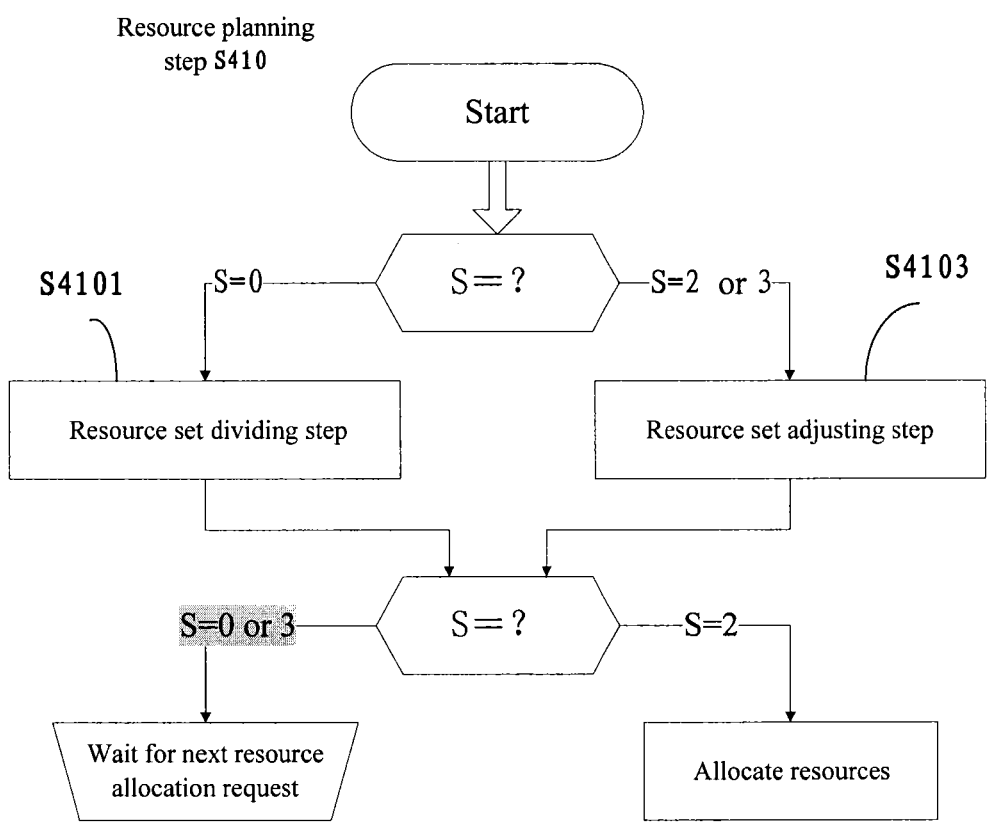
FIG. 5 illustrates a schematic flow chart of a specific implementation of a resource planning step S410 according to an embodiment of the invention.

FIG. 5 illustrates a schematic flow chart of a specific implementation of the resource planning step S410 according to an embodiment of the invention.

As can be seen from FIG. 5, the resource planning step S410 further includes resource set dividing step S4101 and resource set adjusting step S4103.

In the resource set dividing step, a further process is performed according to the value of a status bit S indicating a configuration condition of system resources. When the status bit S is at an initial status value (e.g., S=0), it indicates that the system enters an initialization phase, and thus the set of resource set dividing step S4101 is designed according to the invention to perform the initialization on the set of resources. Specifically when the status bit is at the initial status value (e.g., S=0), the method of configuring a set of wireless communication resources according to the embodiment described above with reference to FIG. 1 and FIG. 2 is performed in the set of resources dividing step S4101 to sort, segment and section a set of wireless communication resources. Reference can be made to the embodiment described above for the configuring method, and a repeated description thereof will be omitted here.

Furthermore the inventors have realized that it may be necessary to readjust the set of resources in the operation of the communication system to thereby satisfy a requirement for accessing new target services as much as possible. For example, the current set of resources may not satisfy a requirement for accessing new target service but can be adjusted (for example, by reallocating resources occupied within a segment by a service) to thereby obtain a sufficient consecutive idle resource to access the new target services. Thus in the embodiment of the invention, the set of resources adjusting step S4103 is performed to adjust the set of resources under a given set of resources adjustment strategy when the status bit is at a second status value (e.g., S=2).

Furthermore the inventors have realized that another possibility of being necessary to readjust the set of resources is for the purpose of admitting a future resource allocation request. For example, it is estimated in a predication algorithm that a bandwidth demand of a normal service can not be satisfied due to a small currently consecutive idle resource. Thus it is necessary to clear up the set of resources comprehensively to reduce resource fragments to thereby improve the probability of access of new services and the utilization ratio of the resources. Of course the set of resources can alternatively be cleaned up by a manually input requirement of a user, etc. In view of this, the set of resources adjusting step S4103 is configured in the embodiment of the invention to clean up the set of resources comprehensively when the status bit is at a value of a third status bit (e.g., S=3) to reduce resource fragments.

As illustrated in FIG. 5, in the case that the status bit is at the initial status value or the third status value, the resource planning means initializes or cleans up the set of resources comprehensively, and thus the system enters into a "status of waiting for a next resource allocation request". In the case that the status bit is at the second status value, the set of resources is adjusted under the given set of resources adjustment strategy, and thus the system further allocates a resource to access the target service.

In an embodiment of the invention, the set of resources adjusting step S4103 can further include an intra-segment adjusting step and an inter-segment adjusting step.

Figure 6:
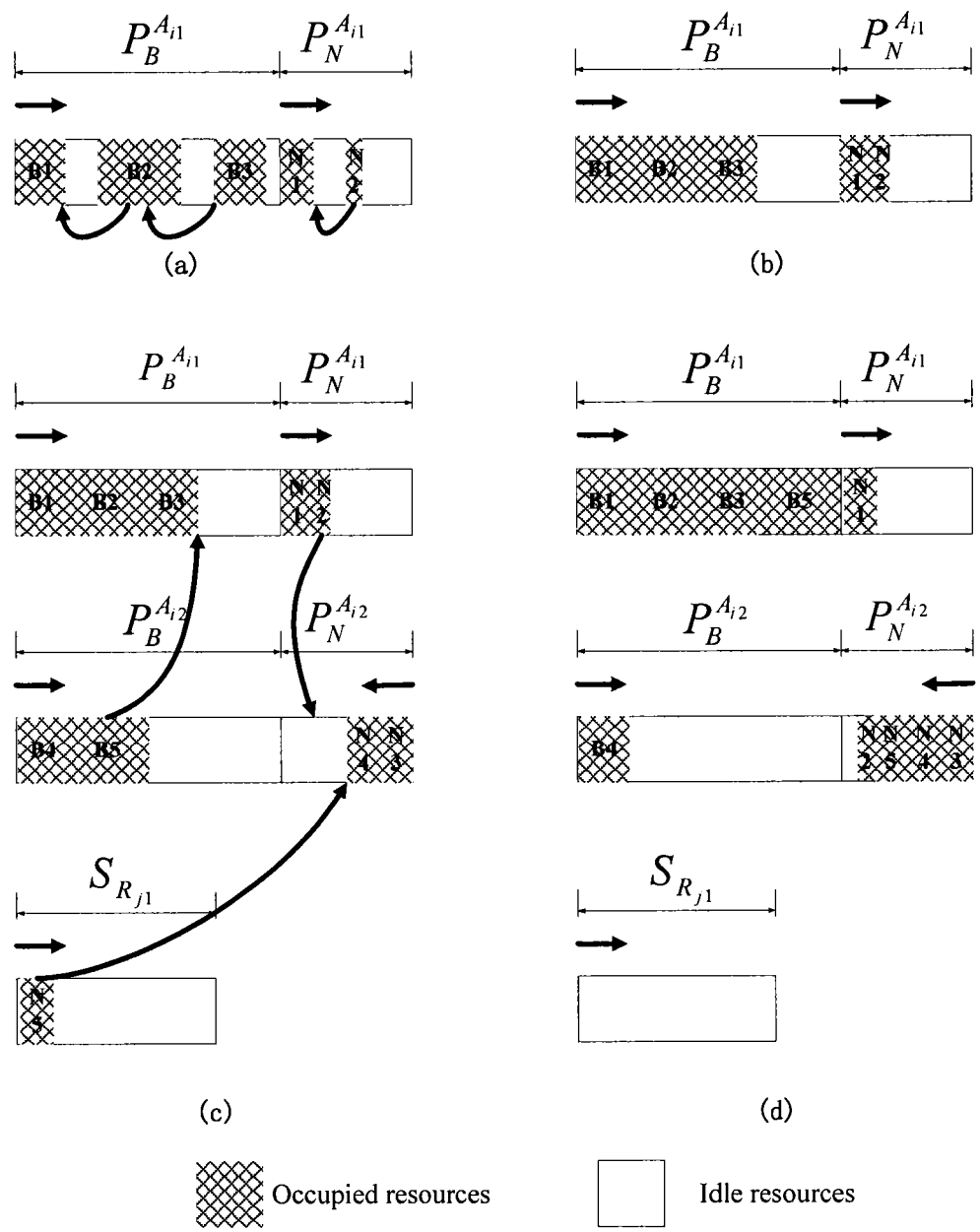
FIGS. 6(a) and 6(b) depict an example before and after intra-segment adjustment respectively.
FIGS. 6(c) and 6(d) depict an example before and after inter-segment adjustment respectively

The intra-segment adjusting step is for the purpose of reducing resource fragments of each section in a segment. Thus the intra-segment adjusting step is to reallocate, for any section in each segment, to each service a segment of resource starting with a first available resource location of the service in the section in an allocation direction of the segment, where the amount of the resources keeps unchanged before and after adjustment. FIG. 6(a) and FIG. 6(b) depict an example before and after intra-segment adjustment respectively. As can be seen from FIG. 6(a), a broadband service section $P_B^{Ai1}$ includes broadband services B1, B2 and B3 occupying resources as illustrated in the figure in an allocation direction of left-to-right. Thus intra-segment adjustment is performed on the section by consecutively allocating a segment of resource starting with the first available resource location B1 so that B1, B2 and B3 become a consecutive segment of resource to thereby offer a larger consecutive idle resource. For narrowband services N1 and N2, adjustment can also be performed this way.

The inter-segment adjusting step is for the purpose of increasing the size of consecutive idle resource. Thus the inter-segment adjusting step is to sort, for each type of section, all the segments in a descending order of the amounts of idle resources of the sections after intra-segment adjustment, where an allocated segment has precedence over an reserved segment, and starting with the last segment in the sorted sequence of segments, the last service in the allocation direction of the segment is taken as an adjusted service, a section in which the adjusted service can be received is searched for in an order of front-to-back in the sorted sequence, and then sorting and adjustment is performed under the rule described above until the set of resources can not be adjusted. FIG. 6(c) and FIG. 6(d) depict an example before and after inter-segment adjustment respectively. In FIG. 6(c), for example, for a broadband service, a large amount of resource is occupied and thus there is a small amount of idle resource in a broadband service section $P_B^{Ai1}$ of a segment indicated in a first row, while a small amount of resource is occupied and thus there is a large amount of idle resource in a broadband service section $P_B^{Ai2}$ of a segment indicated in a second row. Thus B5 taken as an adjusted service is adjusted into the broadband service section $P_B^{Ai1}$ of the segment indicated in the first row as illustrated in FIG. 6(d). For a narrow band service, firstly N5 in a reserved segment is adjusted into a narrowband service section $P_N^{Ai2}$ of the segment indicated in the second row, and thereafter N2 in a narrowband service section with a large amount of idle resource of the segment indicated in the first row is adjusted into a narrowband service section $P_B^{Ai2}$ of the segment indicated in the second row under the rule described above. This way a larger consecutive idle resource is obtained to thereby facilitate access of new target services.

Figure 7:
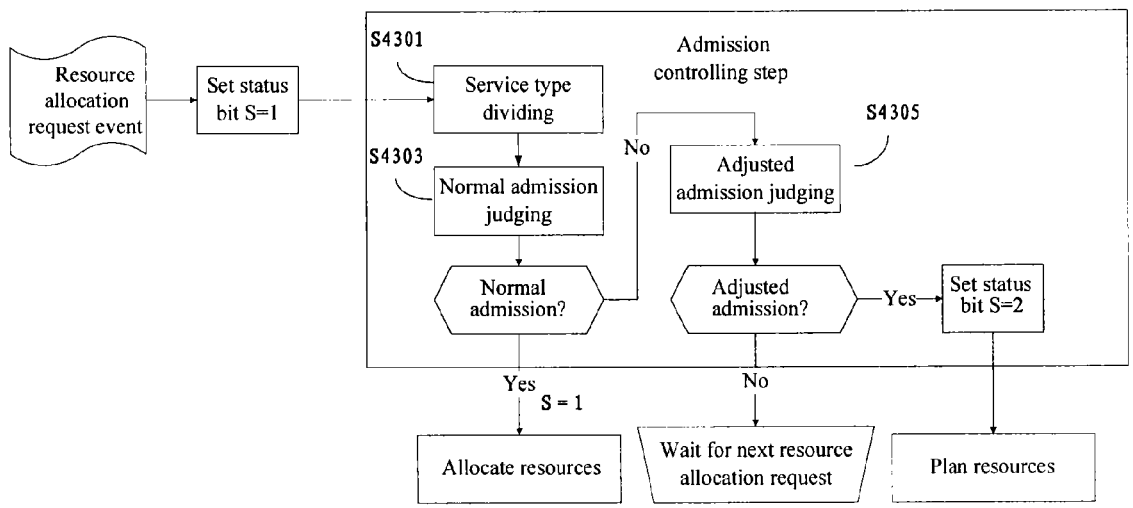
FIG. 7 illustrates a schematic flow chart of an admission controlling step according to an embodiment of the invention.

As can be seen from FIG. 4, the method of managing wireless communication resources according to the embodiment of the invention further includes an admission controlling step S430 of determining whether a bandwidth required for a new resource allocation request can be satisfied, and if it can be satisfied, then allowing access of services corresponding to the resource allocation request; otherwise, rejecting the access of the service. FIG. 7 illustrates a schematic flow chart of the admission controlling step S430 according to an embodiment of the invention. As can be seen from FIG. 7, the admission controlling step can include:

A service type dividing step S4301 is to determine the type of the service corresponding to the resource allocation request. The bandwidth required for the service request is assumed as $BW_{rq}$, the type of the service is determined according to a predetermined threshold $BW_{th}$, and then the flow proceeds to a subsequent normal admission judging step. For example, if the resource required for the request must be consecutive, then the service is determined as a broadband service if $BW_{rq} \geq BW_{th}$; and the service is determined as a narrowband service if $BW_{rq} < BW_{th}$. If the resource required for the request may be inconsecutive and the required least consecutive bandwidth value is $BW_{min}$, then the service is determined as a broadband service if $BW_{min} \geq BW_{th}$; and the service is determined as a narrowband service if $BW_{min} < BW_{th}$. Here just an exemplary method is given, and those skilled in the art can appreciate that the type of a service can be determined in other common methods in the art, and a detailed description thereof will be omitted here.

A normal admission judging step S4303 is to search a corresponding segment or section for a region satisfying an allocation condition according to the type of the service corresponding to the resource allocation request, and if there is a region satisfying the allocation condition, admitting the service; otherwise, rejecting normal admission of the service, and the flow proceeds to an adjusted admission judging step S4305. In this description, normal admission refers to the scenario where a target service can be accessed without any modification to resource configuration. For example, $BW_{rq1}$ belongs to a narrowband service and requires a consecutive resource, and if there is an idle resource in a narrowband service section $P_N^{A_i}$ that can satisfy the requirement, then $BW_{rq1}$ is admitted; $BW_{rq2}$ belongs to a broadband service which requires a consecutive resource and belongs to a service at a high priority, and if this bandwidth requirement can not be satisfied since there is no broadband service section having a sufficient idle resource section at this time, but there is a sufficient resource in a reserved band, then $BW_{rq2}$ is admitted; and $BW_{rq3}$ belongs to a broadband service but requires no consecutive resource, and if there are sufficient resources in a plurality of broadband sections, the least consecutive bandwidth value demand of the service can be satisfied by each section and $BW_{rq3}$ can be satisfied by the sum of their resources at this time, then $BW_{rq3}$ is admitted. When the service is allowed for general admission, the status bit is still maintained at S=1, and at this time a corresponding resource is allocated to the admitted service in a resource allocating step S450.

Figure 8:
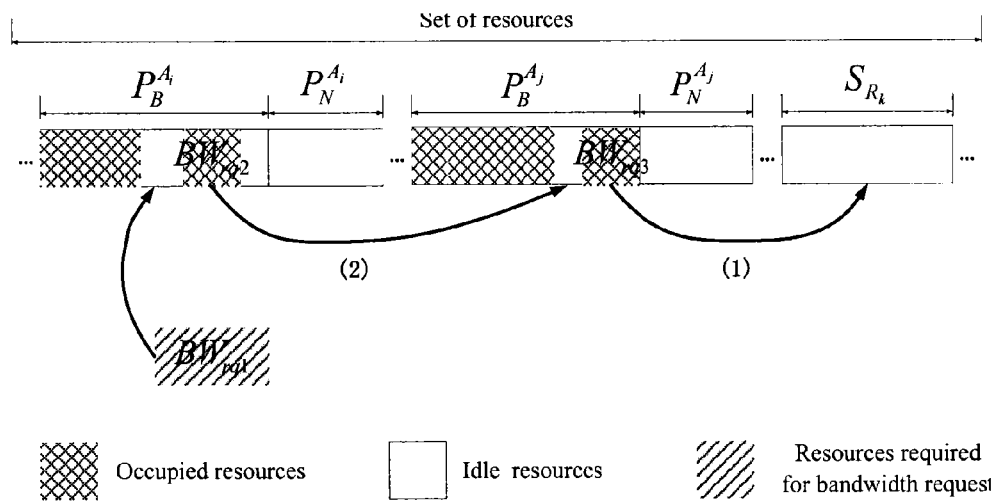
FIG. 8 illustrates a schematic diagram of the adjusting admission judging step.

The adjusted admission judging step S4035 is to judge whether the current allocation pattern of the set of resources can be adjusted to obtain a sufficient bandwidth to thereby satisfy the demand of the non-normally admitted service, and if such a condition is absent, rejecting adjusted admission of the service and to enter the "status of waiting for a next resource allocation request"; otherwise, to determine an adjusted admission decision result and set the status bit to the second status value (S=2), and the flow proceeds to the resource planning step S410. FIG. 8 illustrates a schematic diagram of the adjusted admission judging step. Particularly the non-normally admitted service $BW_{rq1}$ belongs to a broadband service, requires a consecutive resource and has no high priority, the broadband service $BW_{rq2}$ has no high priority, and the broadband service $BW_{rq3}$ has a high priority; and the operative allocation pattern of the set of resources is as illustrated in FIG. 8, and an analysis shows that a broadband service section $P_B^{A_i}$ of an allocated segment will include a sufficient resource satisfying the demand of $BW_{rq1}$ by two operations of (1) moving $BW_{rq3}$ into a reserved segment $S_{R_k}$ and (2) moving $BW_{rq2}$ into a broadband service section $P_B^{A_j}$ of the allocated segment, and then $BW_{rq1}$ will be allowed for adjusted admission.

A core of the adjusted admission judging step is to find an adjustment scheme in which the target service can be admitted in a number as small as possible of adjustments. A flow of an adjusted admission judgment strategy will be described as follows:

1) In the scenario where the target service $BW_{rq1}$ requires a consecutive resource:

a) Segments in which the target service can join (all the segments if $BW_{rq1}$ has a high priority or only the reserved segments if $BW_{rq1}$ has no high priority) are sorted in a descending order of the amounts of idle resources in the types of sections to which the segments belong to thereby obtain a sorted set of segments $\Omega_1$.

b) The following operations are performed for each segment in $\Omega_1$: the last service in the allocation direction of the section to which the target service belongs is found and taken as an adjusted service, and if the adjusted service can be satisfied by an idle resource in another segment and an idle resource spared due to the removed service can satisfy $BW_{rq1}$, then a satisfying one-adjustment strategy is found; otherwise, it indicates that a one-adjustment strategy satisfying $BW_{rq1}$ is absent with the set of resources, and then the flow proceeds to seek a two-adjustment strategy.

c) For each segment in $\Omega_1$, the last service in the allocation direction of the sections to which the target service is found and taken as an adjusted service 1, there are two scenarios: the target service can not be satisfied by the segment or the adjusted service 1 can not be received by another segment even if the adjusted service is removed. If this scenario can be addressed by one adjustment, that is, an adjusted service 2 is further removed in the segment and the service can be received by another segment or the adjusted service 1 can be received by another segment through one adjustment, then a two-adjustment strategy suitable for the target service $BW_{rq1}$ is found; otherwise, it indicates that a two-adjustment strategy satisfying $BW_{rq1}$ is absent with the set of resources, and then the flow further proceeds to seek a three-adjustment strategy.

Following the foregoing analysis, a K-adjustment (K is a natural number equal to or above 1) strategy is defined iteratively as follows: for each segment in $\Omega_1$, the last service in the allocation direction of the section to which the target service belongs is found and taken as an adjusted service 1, and the service is removed, and thereafter $BW_{rq1}$ can be accessed while all the original service demands are satisfied by the set of resources adjusted for a number K−1 of times. Since a computing resource is consumed for adjustment and the performance of the services may also be influenced, it is preferable in adjusted admission judgment to give an upper limit of the number of adjustments, and an adjusted admission strategy can be deemed acceptable only if the number of adjustments does not exceed the upper limit.

2) In the scenario where the target service $BW_{rq2}$ requires no consecutive resource: the demand of $BW_{rq2}$ is divided into several parts $BW_{rq2\_1}, BW_{rq2\_2}, \ldots, BW_{rq2\_n}$ according to a service feature thereof, and then each part is regarded as a service which requires a consecutive bandwidth, and an appropriate adjustment strategy is sought for as described above. There are a specific number of adjustments for the adjustment strategy of each part, and the largest one among these numbers is taken as the number of adjustments for $BW_{rq2}$.

It shall be noted that the adjusted admission decision result described above can include a resource set adjustment strategy and an adjusted admission strategy. In the resource planning step, the resource can be adjusted under the resource set adjustment strategy in the adjusted admission decision result, and in the resource allocating step to be described below, the target service can be adjusted to be admitted under the adjusted admission strategy in the adjusted admission decision result.

Figure 9:
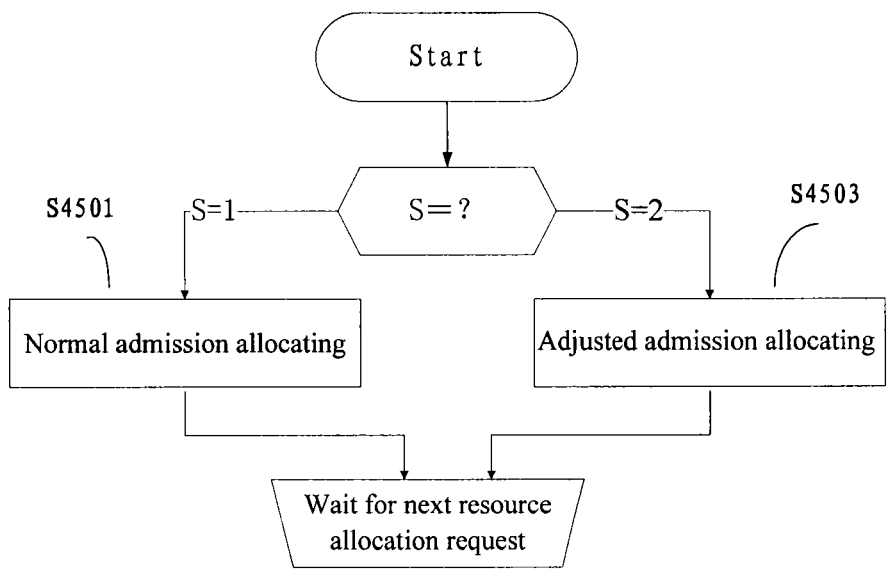
FIG. 9 illustrates a schematic flow chart of a resource allocating step according to an embodiment of the invention.

As can be seen from FIG. 4, the method of managing wireless communication resources according to the embodiment further includes the resource allocating step S450 of allocating a corresponding resource to the admitted service according to the bandwidth demand. FIG. 9 illustrates a schematic flow chart of a resource allocating step according to an embodiment of the invention. As can be apparent from FIG. 9, the resource allocating step S450 can include a normal admission allocating step S4501 and an adjusted admission allocating step S4503. Particularly the normal admission allocating step S4501 is to allocate a resource to the target service when the target service is normally admitted, and the adjusted admission allocating step S4503 is to allocate a resource to the target service when the target service is adjustment-admitted.

As illustrated in FIG. 9, in the resource allocating step S450, an allocation pattern is decided according to the value of the status S, and the flow enters the "status of waiting for next resource allocation request" at the end of allocation. There are two allocation patterns: when S=1, it indicates that the service is normally admitted, and an appropriate segment/section has to be searched for, and then resources are allocated to the service as needed, and thus the normal admission allocating step S4501 is performed; and when S=2, it indicates that the service is adjustment-admitted, and a resource adjusting sub-module has reserved sufficient resources for the request by adjusting the set of resources, and at this time the resources can simply be allocated among this part of resources to the service as needed, and thus an adjusted admission allocating step S4503 is performed.

The normal admission allocating step is to allocate resources to normally admitted services. According to an embodiment of the invention, the normal admission allocating step can further include a segment selecting step and an intra-segment allocating step. A specific flow will be described below:

1) The segment selecting step is to select for the target service a target segment in which resources are available.

a) All candidate segments are searched for in which the demand of the target service can be satisfied by an idle resource in the section corresponding to the type of the target service;

b) The segment in which the best Quality of Service (QoS) is available to the target service is selected among these candidate segments;

c) The segment with the smallest amount of idle resource is selected among the segments with the same QoS; and d) When an allocated segment and a reserved segment are as candidate segments, the allocated segment is preferentially selected.

For example, when the normally admitted service $BW_{rq1}$ belongs to a narrowband service, requires a consecutive resource and has no high priority, all the segments with a consecutive idle resource larger than that of the segment in which the narrowband service section of $BW_{rq1}$ resides are selected for the service as candidate segments; and further the segment with the best QoS available to the service $BW_{rq1}$ is selected (for example, if the resources are spectrums, then the segment with the best channel quality is selected) among these candidate segments, and if the same QoS is available in these segments, then the segment with the least amount of idle resource in a narrowband service section is selected.

When the normally admitted service $BW_{rq2}$ belongs to a broadband service, requires a consecutive resource and has a high priority, candidate segments include all the appropriate allocated segments and reserved segments, and resources will be selected from a reserved segment only if none of the allocated segments is appropriate.

When the normally admitted service $BW_{rq3}$ belongs to a broadband service and does not requires a consecutive resource, let the least consecutive resource required for the service is $BW_{min}$, and then firstly a candidate segment satisfying $BW_{rq3}$ is selected, and if such a segment is absent, then a candidate segment satisfying $BW_{min}$ is selected. The candidate segments are sorted in a descending order of QoSs among the allocated segments or the reserved segments with the allocated segments having precedence over the reserved segments, and then the least segment satisfying the service $BW_{rq3}$ is selected.

2) The intra-segment allocating step is to allocate a resource to the target service in the target segment finally selected in the segment selecting step described above. Particularly when a resource is allocated in a section corresponding to the type of the target service in the target segment for the first time, firstly an allocation direction (resources are sorted in an ascending or descending order, and the direction may be different for respective sections) is selected (referring to FIG. 10), and then the first location at which the bandwidth demand of the target service can be satisfied is searched for in this direction in subsequent sorting and allocated to the target service.

Figure 10:
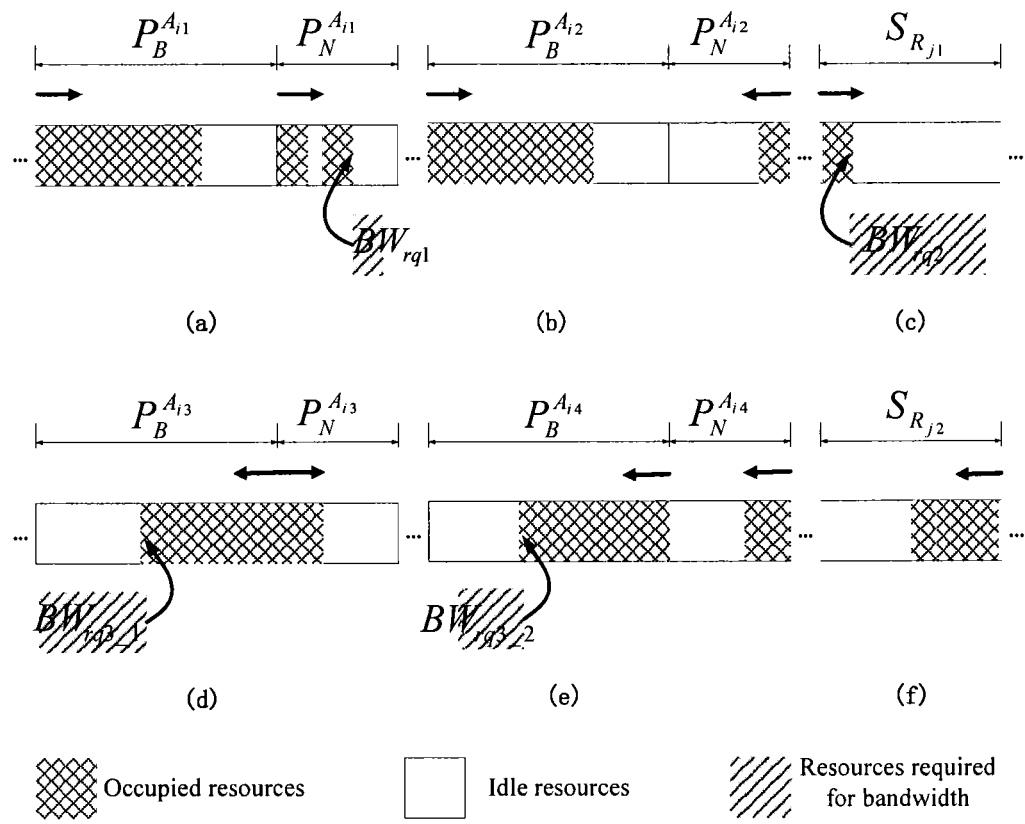
FIG. 10 illustrates a schematic diagram of resource allocation according to an embodiment of the invention, where

For example, FIG. 10 illustrates a schematic diagram of resource allocation according to an embodiment of the invention. In FIG. 10, FIG. 10(a) to FIG. 10(f) depict all possible direction settings of allocated segments and reserved segments. FIG. 10(a) depicts that the system allocates in an allocated segment $P_N^{Aj1}$ the first location at which the demand can be satisfied for the narrowband service request $BW_{rq1}$; FIG. 10(c) depicts that the system allocates in a reserved segment $S_{Rj1}$ the first location at which the demand can be satisfied for the broadband service request $BW_{rq2}$ at a high priority; and FIG. 10(d) and FIG. 10(e) depicts that the system allocates respectively in two allocated segment $P_B^{Aj3}$ and $P_B^{Aj4}$ a segment of resource for the inconsecutive broadband service $BW_{rq3}$ to thereby satisfy the overall demand of $BW_{rq3}$.

The adjusted admission allocating step is to allocate resources to an adjustment-admitted service. Since the corresponding adjustment strategy has been given in the adjusted admission judging step S4035 (see the adjusted admission judgment strategy described above in details), the resources of the current services are adjusted under this strategy in the resource set adjusting step S4103, and at this time, resources can simply allocated to the target service in the target segment in the adjusted admission allocating step, under the intra-segment allocation strategy of the normal admission allocating step described above, and a repeated description thereof will be omitted here.

Figure 11:
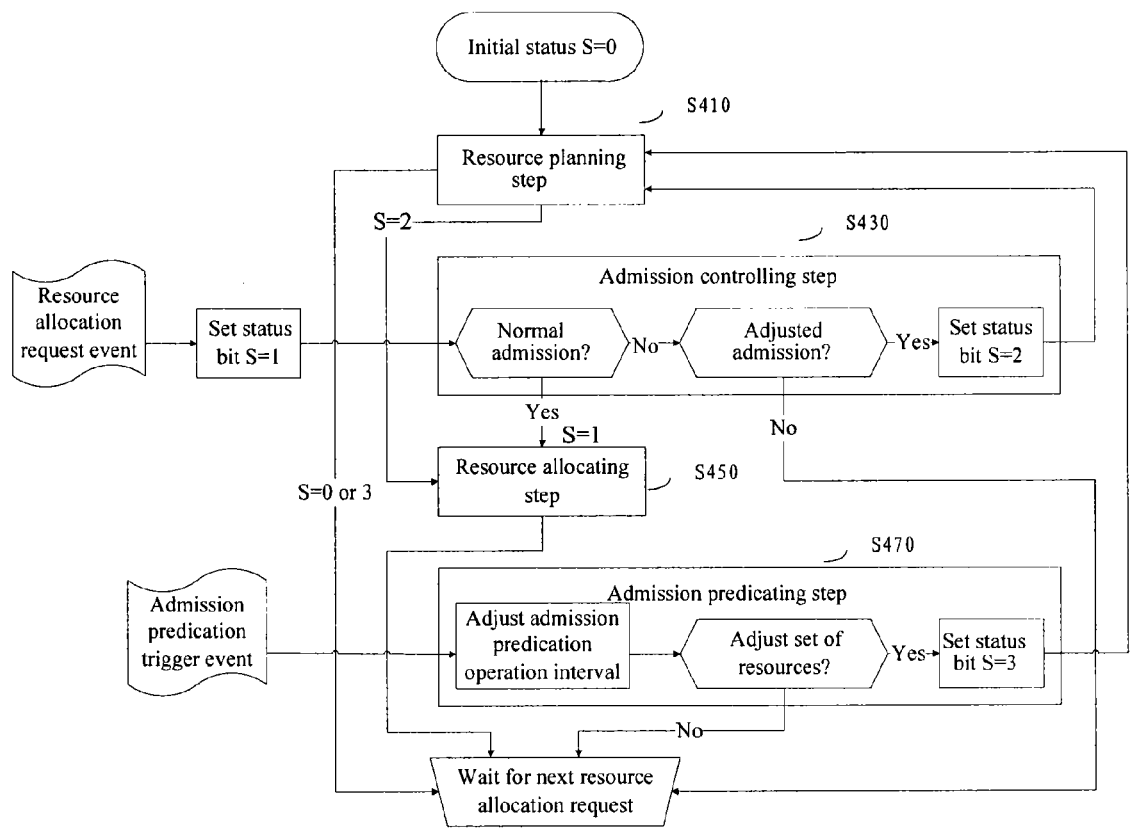
FIG. 11 illustrates a schematic flow chart of a method for managing wireless communication resources according to another embodiment of the invention.

FIG. 11 illustrates a schematic flow chart of a method of managing wireless communication resources according to another embodiment of the invention. As can be seen from comparison with the flow chart of the method of managing wireless communication resources illustrated in FIG. 4, the method in FIG. 11 further includes an admission predicating step S470 of predicating admission rates of future services to decide whether to adjust the current use condition of the set of resources to thereby increase the admission rates of the future services.

Figure 12:
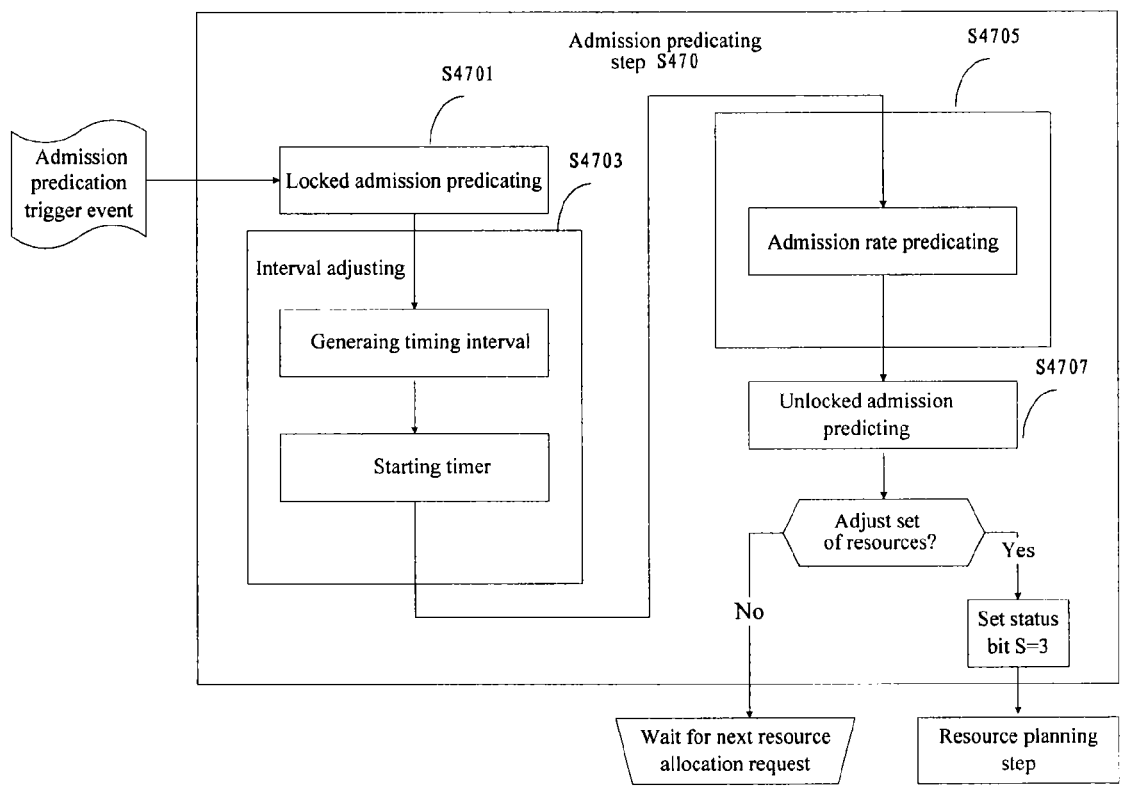
FIG. 12 illustrates a schematic flow chart of a specific implementation of an admission predicating step according to an embodiment of the invention.

FIG. 12 illustrates a schematic flow chart of a specific implementation of an admission predicating step according to an embodiment of the invention. As can be seen from FIG. 12, the admission predicating step is driven by an "admission predication trigger event". When an event takes place and means to perform the admission predicating step is in a "non-locked status", the admission predicating step is started. This trigger event may be an event of a system initialization completion, an event of an admission predication completion or an event of a resource allocation termination.

A locked admission predicating step S4701 is to put the means to perform the admission predicating step in a "locked status" in which the means to perform the admission predicating step will not respond to any other "admission predication trigger event". It shall be noted that this step is designed as a preferred step for the purpose of ensuring that the means to perform the admission predicating step will not be interfered by any other event. However those skilled in the art can readily appreciate that the function of the admission predicating step can alternatively be performed without this step.

An interval adjusting step S4703 is to adjust an interval of time by which two adjacent admission prediction operations are spaced. Since an admission prediction result may resulting in adjustment of the set of resources, and some computation has to be consumed for the adjustment and a frequency at which the resources are adjusted has to vary with a use condition of the set of resources, thus this interval adjusting step is added to ensure an effective frequency at which the resources are adjusted.

An admission rate predicating step S4705 is to predicate an admission rate of a future service and to decide whether an adjustment for the set of resources is needed under the current use condition of the set of resources.

An unlocked admission predicating step S4707 is to put the means to perform the admission predicating step in an "unlocked status" in which the means to perform the admission predicating step restores to respond to an "admission predication trigger event". It shall also be noted that this step is designed as a preferred step designed in correspondence to the locked admission predicating step S4701 described above. If the locked admission predicating step S4701 is not set, then the unlocked admission predicating step S4707 will not be needed either.

As can further be seen from FIG. 12, the admission predicating step further includes the following subsequent operations: it is decided whether to adjust the set of resources according to an admission rate predication result, and if so, then the status bit is set as S=3 indicating that this method is to readjust the set of resources to admit a future resource allocation request, and the flow proceeds to the resource planning step; otherwise, the flow proceeds to the "status of waiting for a next resource allocation request".

The interval adjusting step S4703 and the admission probability predicating step S4705 will be further described below.

Actually the interval adjusting step S4703 is to set a timer in a flow to be described below (referring to FIG. 12).

1) A timing interval is generated: a timing interval $T_{int\ erval}$ is generated to adjust an interval of time between two admission predication operations. The value of the timing interval is adjusted according to a use condition of the set of resources and a condition of a bandwidth allocation request: when the frequency of the bandwidth request is low, $T_{int\ erval}$ is increased to lower the frequency of admission predication; when the frequency of the bandwidth request is gradually increased, $T_{int\ erval}$ is decreased appropriately to ensure an access ratio of a new service; and when the frequency of the bandwidth request is increased to some extent, $T_{int\ erval}$ is increased again to prevent an increased burden on normal allocation of the resources. When there is a large amount of idle resource in the set of resources, $T_{int\ erval}$ is increased to lower the frequency of admission predication; when there is an decreasing amount of idle resource in the set of resources, $T_{int\ erval}$ is decreased appropriately to ensure an access ratio of a new service; and when the amount of idle resource in the set of resources is decreased to some extent, $T_{int\ erval}$ is increased again because it is difficult to further increase an access ratio by adjusting the resources. For example, if an average arrival duration of network users is $T_{duration}$, then a reference value of $T_{int\ erval}$ can be set to m times the value of $T_{duration}$, and $T_{int\ erval}$ can be increased or decreased at a rate of n times the value of $T_{duration}$, where both m and n are positive integers. A specific value by which the timing interval is adjusted can be designed by those skilled in the art without departing from the scope of the invention, and a further description thereof will be omitted here.

2) A timer is started: a timer is started and expires at the end of the interval $T_{int\ erval}$.

In the admission rate predicating step S4705, a normal admission rate of a future service is predicated as an average admission rate P of services arriving in a future period of time T in the current use condition of the (unadjusted) set of resources. An exemplary calculation method will be given below.

$$P = \sum_{1 \le i \le N} p_i \times q_i,$$

where N is the number of service types, $p_i$ is the proportion of the i-th type of service among the services arriving in the future, and $q_i$ is an access rate of the i-th type of service.

$$p_i = \frac{T \times \lambda_i}{\sum_{1 \le i \le N} T \times \lambda_i},$$

where $\lambda_i$ is an average arrival probability of the i-th type of service, which can be derived from a statistic of service data of the system, so $T \times \lambda_i$ is derived as the number of the i-th type of services arriving in a period T of time.

$$q_i = \begin{cases} 1, & \text{if } \frac{\alpha_i}{T \times \lambda_i} \ge 1, \\ \frac{\alpha_i}{T \times \lambda_i}, & \text{others.} \end{cases}$$

where $\alpha_i$ is the number of the i-th type of services accessible over the current set of resources.

$\alpha_i$ is determined jointly according to a specific use condition of the set of resources, a resource allocation pattern and relevant parameters of the i-th type of service. If the current set of resources includes M sections in total available to the i-th type of service and their idle consecutive bandwidths are $C_1, C_2, \ldots, C_M$ respectively, then $\alpha_i$ is estimated as $$\alpha_i = \sum_{1 \le j \le M} \left\lfloor \frac{C_j}{\beta_i} \right\rfloor + \delta_i,$$

where $\lfloor\ \rfloor$ is a rounding-down operation, $\beta_i$ is an average bandwidth of the i-th type of service, and $\delta_i$ is the i-th type of service to be completed in a future period T of time.

P is derived as described above and compared with a specific expected admission rate $P_{th}$ preset by the system: if $P \ge P_{th}$, then it indicates that the current use condition of the set of resources can satisfy an expected demand and thus will not be adjusted. On the contrary, if $P < P_{th}$, then the set of resources will be adjusted.

It shall be noted that an exemplary method of predicating an admission rate has been given above. Those skilled in the art can alternatively use other common methods of predicating an admission rate in the prior art without departing from the scope of the invention.

With the method of managing wireless communication resources according to the embodiment of the invention described above, wireless resources can be flexibly managed and allocated to satisfy a bandwidth demand of a user and further ensure fair allocation of the resources and also improve the probability of availability of a resource to a service to thereby effectively utilize the resources.

Figure 13:
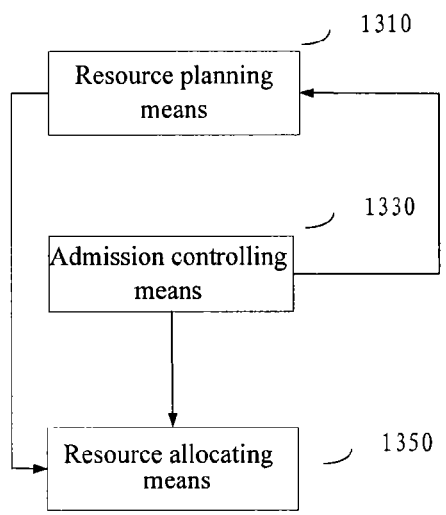
FIG. 13 illustrates a schematic structural diagram of a system for managing wireless communication resources according to an embodiment of the invention.

In correspondence to the method of managing wireless communication resources according to the embodiment of the invention described above, there is proposed a system for managing wireless communication resources. FIG. 13 illustrates a schematic structural diagram of a system for managing wireless communication resources according to an embodiment of the invention. As can be seen from FIG. 13, the system includes the following means.

Resource planning means 1310 configured to plan a set of wireless communication resources according to a status bit to provide a specification in allocation of resources to respective networks or services to thereby make full use of the resources.

Figure 14:
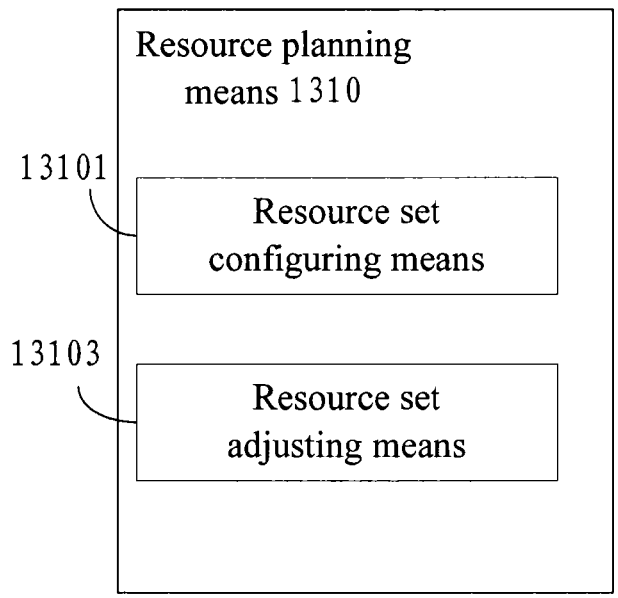
FIG. 14 illustrates a schematic structural diagram of resource planning means according to an embodiment of the invention.

FIG. 14 illustrates a schematic structural diagram of the resource planning means 1310 according to an embodiment of the invention.

As can be seen from FIG. 14, the resource planning means 1310 further includes resource set configuring means 13101 and resource set adjusting means 13103.

The resource planning means 1310 performs a further process according to the value of the status bit S. When the status bit S is at an initial status value (e.g., S=0), it indicates that the system enters an initialization phase, and thus it is designed according to the invention that the set of resources is initialized in the resource set configuring means 13101.

Furthermore the inventors have realized that it may be necessary to readjust the set of resources in the operation of the communication system to thereby satisfy a requirement of accessing a new target service as much as possible. Thus in the embodiment of the invention, the resource set adjusting means 13103 is configured to adjust the set of resources under a given set of resources adjustment strategy when the status bit is at a second status value (e.g., S=2).

Furthermore the inventors have realized that another possibility of being necessary to readjust the set of resources is for the purpose of admitting a future resource allocation request. In view of this, the set of resources adjusting means 13103 is configured in the embodiment of the invention to clean up the set of resources comprehensively when the status bit is at a third status bit (e.g., S=3) so as to reduce resource fragments.

Reference can be made to the corresponding parts of the method described above for particularly how the resource planning means 1310, and the resource set configuring means 13101 and the resource set adjusting means 13103 included therein operate, and a repeated description thereof will be omitted here.

Figure 15:
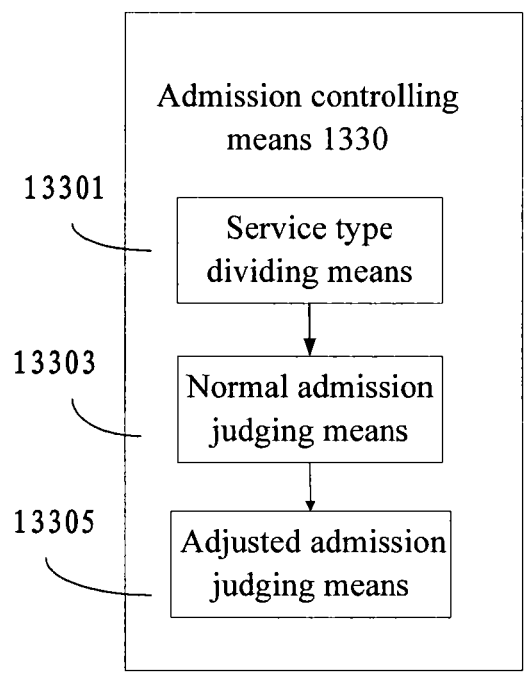
FIG. 15 illustrates a schematic structural diagram of admission controlling means according to an embodiment of the invention.

As can be seen from FIG. 13, the system for managing wireless communication resources according to the embodiment of the invention further includes admission controlling means 1330 configured to determine whether a bandwidth required by a new resource allocation request can be satisfied, and if so, allowing access of services corresponding to the resource allocation request; otherwise, rejecting the access of the service. FIG. 15 illustrates a schematic structural diagram of the admission controlling means 1330 according to an embodiment of the invention. As can be apparent from FIG. 7, the admission controlling means 1330 can include:

Service type dividing means 13301 is configured to determine the type of the service corresponding to the resource allocation request.

Normal admission judging means 13303 is configured to search a corresponding segment or section for a region satisfying an allocation condition according to the type of the service corresponding to the resource allocation request, and if there is a region satisfying the allocation condition, admitting the service; otherwise, rejecting normal admission of the service and proceeding to adjusted admission judging means 13305.

The adjusted admission judging means 13305 is configured to judge whether the current allocation pattern of the set of resources can be adjusted to obtain a sufficient bandwidth to thereby satisfy the demand of the non-normally admitted service, and if such a condition is absent, rejecting adjusted admission of the service and entering into a "status of waiting for a next resource allocation request"; otherwise, setting the status bit to the second status value (S=2) and proceeding to the resource planning means 1310.

A core of adjusted admission judgment is to find an adjustment scheme in which the target service can be admitted in a number as small as possible of adjustments. Reference can be made to the corresponding description of the method described above for a flow of an adjusted admission judgment strategy, and a repeated description will be omitted here.

Figure 16:
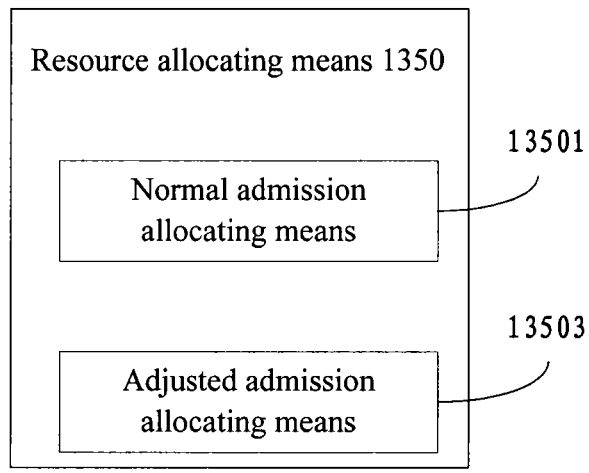
FIG. 16 illustrates a schematic structural diagram of resource allocating means according to an embodiment of the invention.

As can be seen from FIG. 13, the system for managing wireless communication resources according to the embodiment further includes resource allocating means 1350 configured to allocate a corresponding resource to the admitted service according to the bandwidth demand. FIG. 16 illustrates a schematic structural diagram of the resource allocating means 1350 according to an embodiment of the invention. As can be seen from FIG. 16, the resource allocating means 1350 can include normal admission allocating means 13501 and adjusted admission allocating means 13503. Particularly the normal admission allocating means 13501 is configured to allocate a resource to the target service when the target service is normally admitted, and the adjusted admission allocating means 13503 is configured to allocate a resource to the target service when the target service is adjustment-admitted.

Reference can be made to the corresponding description of the method described above for particularly how the resource allocating means 1350 implements its function, and a repeated description will be omitted here.

Figure 17:
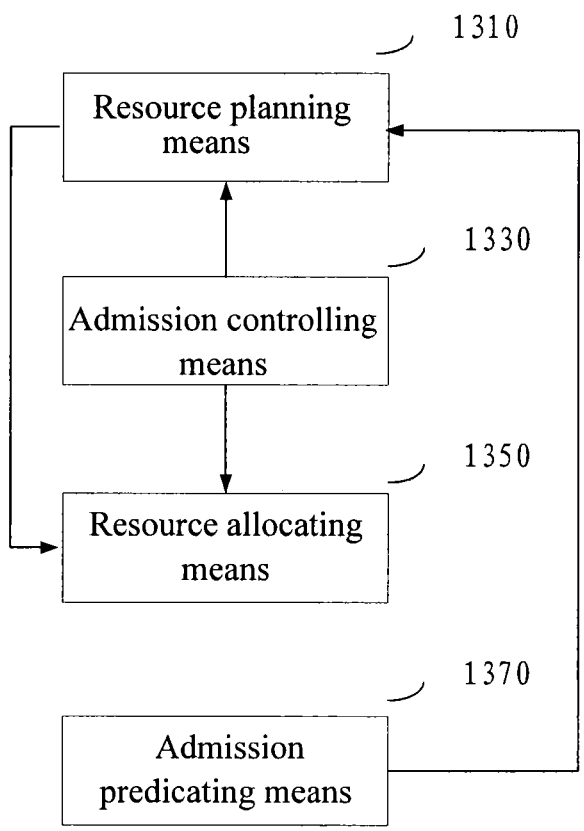
FIG. 17 illustrates a schematic structural diagram of a system for managing wireless communication resources according to another embodiment of the invention.

FIG. 17 illustrates a schematic structural diagram of a system for managing wireless communication resources according to another embodiment of the invention. As can be seen from comparison with the structural diagram of the system for managing wireless communication resources illustrated in FIG. 13, the system in FIG. 17 further includes admission predicating means 1370 configured to predicate an admission rate of a future service to decide whether to adjust the current use condition of the set of resources to thereby increase the admission rate of the future service.

Figure 18:
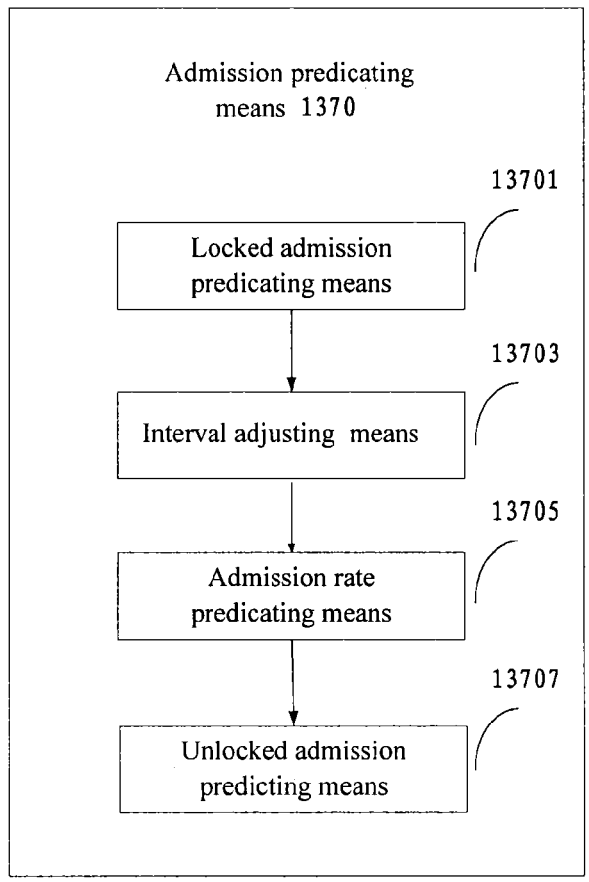
FIG. 18 illustrates a schematic structural diagram of admission predicating means according to an embodiment of the invention.

FIG. 18 illustrates a schematic structural diagram of the admission predicating means 1370 according to an embodiment of the invention. As can be seen from FIG. 18, the admission predicating means 1370 is driven by an "admission predication trigger event". When an event takes place and the admission predicating means 1370 is in a "non-locked status", an admission predicating step is started. This trigger event may be an event of system initialization completion, an event of admission predication completion or an event of resource allocation termination t.

A locked admission predicating means 13701 is configured to put the admission predicating means 1370 in a "locked status" in which the admission predicating means 1370 will not respond to any other "admission predication trigger event". It shall be noted that this locked admission predicating means 13701 is designed as preferred means for the purpose of ensuring that the admission predicating means 1370 will not be interfered by any other event. However those skilled in the art can readily appreciate that the function of the admission predicating means 1370 can alternatively be performed without this means.

An interval adjusting means 13703 configured is to adjust an interval of time by which two adjacent admission prediction operations are spaced.

An admission rate predicating means 13705 is configured to predicate an admission rate of a future service and to decide whether to adjust the set of resources under the current use condition of the set of resources An unlocked admission predicating means 13707 is configured to put the means to perform the admission predicating step in an "unlocked status" in which the means to perform the admission predicating step restores to respond to an "admission predication trigger event". It shall also be noted that this means is designed as preferred means in correspondence to the locked admission predicating means 13701 described above. If the locked admission predicating means 13701 is not set, then the unlocked admission predicating means 13707 will not be needed either.

Reference can be made to the corresponding description of the method described above for particularly how the admission predicating means 1370 implements its function, and a repeated description will be omitted here.

With the system for managing wireless communication resources according to the embodiment of the invention described above, wireless resources can be flexibly managed and allocated to satisfy a bandwidth demand of a user and further ensure fair allocation of the resources and also improve the probability of availability of a resource to a service to thereby effectively utilize the resources.

Figure 19:
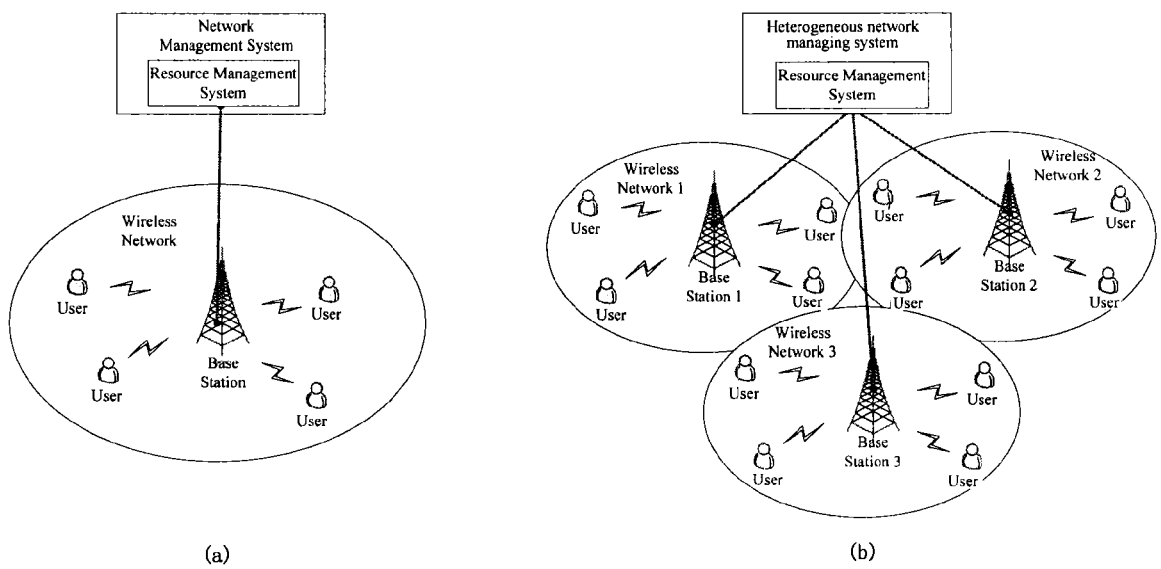
FIG. 19 illustrates a schematic diagram showing a relationship between the system for managing wireless communication resources according to the invention and a wireless communication network(s).

It shall be noted that the system for and method of managing wireless communication resources according to the invention can be applicable to communication networks in different constituent structures but will not be limited to a communication network of various network types and/or service types. FIG. 19 illustrates a schematic diagram of a relationship between the system for managing wireless communication resources according to the invention and a wireless communication network(s). As can be seen from FIG. 19, when the system is used to manage a single network, the system resides in a managing system of the network and performs corresponding resource management according to a set of resources in the network and a bandwidth demand of a user; and when the system is used to manage multiple coexisting heterogeneous network, the system resides in a managing system of the heterogeneous networks and performs corresponding resource management according to a set of resources throughout the heterogeneous networks and bandwidth demands of the respective networks.

Furthermore there is further proposed according to another embodiment of the invention a base station including the resource managing system according to the embodiment described above.

The respective constituent modules and units of the apparatus described above can be configured in form of software, firmware or hardware or any combination thereof well known to those skilled in the art, a repeated description of which will be omitted here. In the event of being configured in software or firmware, program constituting the software can be installed from a storage medium or a network to a computer with a dedicated hardware structure which can perform various functions when various pieces of program are installed thereon.

In the case that the foregoing series of processes are performed in software, program constituting the software can be installed from a network, e.g., the Internet, or a storage medium, e.g., a removable medium.

Those skilled in the art shall appreciate that the storage medium will not be limited to the removable medium in which the program is stored and which is distributed separately from the apparatus to provide a user with the program. Examples of the removable medium include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be an ROM, a hard disk included in a storage portion, etc., in which the program is stored and which is distributed together with the apparatus including the same to the user.

The invention further proposes a program product on which machine readable instruction codes are stored. The instruction codes upon being read and executed by a machine can perform the methods according to the embodiments of the invention described above.

Correspondingly a storage medium, on which the program product with the machine readable instruction codes stored thereon is carried, will also be encompassed in the disclosure of the invention. The storage medium can include but will not be limited to a floppy disk, an optical disk, an optic-magnetic disk, a memory card, a memory stick, etc.

Finally it shall be further noted that the terms "include" and "comprise" and any variants thereof are intended to encompass nonexclusive inclusion so that a process, a method, an article or an apparatus including a series of elements includes both those elements and one or more other elements which are not listed explicitly or one or more elements inherent to the process, the method, the article or the apparatus. Also unless stated otherwise, an element being defined in the sentence "include/comprise a(n) . . . " will not exclude the presence of one or more additional identical element in the process, the method, the article or the apparatus including the element.

Although the embodiments of the invention have been described in details with reference to the drawings, it shall be appreciated that the implementations described above are merely illustrative but not intended to limit the invention. Those skilled in the art can make various modifications and variations to the implementations described above without departing from the spirit and scope of the invention. Accordingly the scope of the invention shall be defined only by the appended claims and their equivalents.

The invention claimed is:

1. A method for configuring a set of wireless communication resources, comprising:
 sorting, via circuitry of a resource set configuring apparatus, a set of resources in a preset mode;
 dividing, via the circuitry, the sorted set of resources into segments, wherein the segments comprise segments of different types and with different functions; and
 further dividing, via the circuitry, the segments into sections, wherein each section is used for a corresponding type of service,
 wherein the segments comprise allocated segments and reserved segments, the allocated segments being configured to satisfy bandwidth demands of a normal service, and the reserved segments being configured to ensure access of a service with high priority or to be used as buffer areas in adjusting the set of resources, and wherein the allocated segments and the reserved segments exist alternately.

2. The method according to claim 1, wherein the sorting a set of resources in a preset mode comprises at least one of the processes of:
sorting, via the circuitry, spectrum resources in an ascending order of available frequencies;
sorting, via the circuitry, timeslot resources in a temporal order; and
sorting, via the circuitry, time-frequency block resources firstly in an ascending order of frequencies and then in an order of timeslots, or sorting time-frequency block resources firstly in an order of timeslots and then in an ascending order of frequencies.

3. A resource set configuring apparatus for configuring a set of wireless communication resources, comprising:
circuitry configured to:
sort a set of resources in a preset mode;
divide the sorted set of resources into segments, wherein the segments comprise segments of different types and with different functions; and
further divide the segments into sections, wherein each section is used for a corresponding type of service,
wherein the segments comprise allocated segments and reserved segments, the allocated segments being configured to satisfy bandwidth demands of a normal service, and the reserved segments being configured to ensure access of a service with high priority or to be used as buffer areas in adjusting the set of resources, and wherein the allocated segments and the reserved segments exist alternately.

4. The resource set configuring apparatus according to claim 3, wherein the circuitry is further configured to at least one of:
sort spectrum resources in an ascending order of available frequencies;
sort timeslot resources in a temporal order; and
sort time-frequency block resources firstly in an ascending order of frequencies and then in an order of timeslots, or sorting time-frequency block resources firstly in an order of timeslots and then in an ascending order of frequencies.

5. A method for managing wireless communication resources, comprising:
a resource planning step for
performing, via circuitry of a wireless communication resource managing system, the following operations to configure a set of wireless communication resources when a status bit indicating a configuration condition of system resources is at an initial status value:
sorting the set of resources in a preset mode,
dividing the sorted set of resources into segments, wherein the segments comprise segments of different types and with different functions, and
further dividing the segments into sections, wherein each section is used for a corresponding type of service,
adjusting, via the circuitry, the set of resources according to a given decision result for an adjusted admission when the status bit is at a second status value, and
cleaning up, via the circuitry, the set of resources comprehensively to reduce resource fragments when the status bit is at a third status value;
an admission controlling step for determining, via the circuitry, whether a bandwidth required by a new resource allocation request can be satisfied, and if so, allowing, via the circuitry, access of a service corresponding to the resource allocation request; otherwise, rejecting, via the circuitry, the access of the service; and
a resource allocating step for allocating, via the circuitry, corresponding resources to the admitted service according to bandwidth demand of the service.

6. The method for managing wireless communication resources according to claim 5, wherein:
the admission controlling step further comprises:
a service type dividing step for determining, via the circuitry, the type of the service corresponding to the resource allocation request;
a normal admission judging step for searching, via the circuitry, corresponding segments or sections for regions satisfying an allocation condition according to the type of the service corresponding to the new resource allocation request, and if there are region(s) satisfying the allocation condition, admitting, via the circuitry, the service; otherwise, rejecting, via the circuitry, normal admission of the service and proceeding to an adjusted admission judging step; and
the adjusted admission judging step for judging, via the circuitry, whether a sufficient bandwidth can be obtained by adjusting the current allocation mode of the set of resources so as to satisfy the demand of the non-normally admitted service, and if it is judged as negative, rejecting, via the circuitry, adjusted admission of the service and entering, via the circuitry, into a status of waiting for a next resource allocation request; or if it is judged as positive, setting, via the circuitry, the status bit to the second status value and proceeding to the resource planning step.

7. The method for managing wireless communication resources according to claim 6, wherein:
for the target service for which consecutive resources are required, in the adjusted admission judging step, sorting, via the circuitry, segments in which the target service can join, in a descending order of the amounts of idle resources, in the sections of the types to which these segments belong, thereby obtaining a sorted set of segments $\Omega_1$; and for each segment in $\Omega_1$, finding, via the circuitry, the last service in an allocation direction of a section to which the target service belongs as a first adjusted service, and if the first adjusted service is removed and thereafter the target service can be accessed while all original service demands are satisfied by the set of resources adjusted for a number K−1 of times, determining, via the circuitry, the decision result for the adjusted admission, setting, via the circuitry, the status bit as the second status value, and proceeding to the resource planning step, wherein K is a natural number below or equal to a predetermined threshold $K_{max}$; and
for the target service for which consecutive resources are not required, in the adjusted admission judging step, dividing, via the circuitry, the demand of the target service into several parts according to feature of the target service, and then regarding, via the circuitry, each part as a service for which a consecutive bandwidth is required and processing, via the circuitry, in the same manner as the target service for which consecutive resources are required.

8. The method for managing wireless communication resources according to claim 5, wherein the resource allocating step further comprises:
- a normal admission allocating step of allocating, via the circuitry, resources to the target service when the target service is normally admitted; and
- an adjusted admission allocating step of allocating, via the circuitry, resources to the target service according to the decision result for the adjusted admission when the target service is adjustment-admitted.

9. The method for managing wireless communication resources according to claim 8, wherein the normal admission allocating step further comprises a segment selecting step and an intra-segment allocating step, wherein:
- the segment selecting step comprises: a) searching, via the circuitry, for all candidate segments in which the demand of the target service can be satisfied by an idle resource in a section corresponding to the type of the target service; b) selecting, via the circuitry, among these candidate segments the segment in which the best Quality of Service, QoS, is available to the target service; c) selecting, via the circuitry, the segment with the smallest amount of idle resources among the segments with the same QoS; and d) when an allocated segment and a reserved segment are candidate segments simultaneously, preferentially selecting, via the circuitry, the allocated segment; and
- an intra-segment allocating step comprises: allocating resources, via the circuitry, to the target service in a target segment finally selected in the segment selecting step, wherein when a resource is allocated in a section corresponding to the type of the target service in the target segment for the first time, firstly selecting, via the circuitry, an allocation direction, and then searching, via the circuitry, for the first location at which the bandwidth demand of the target service can be satisfied in the direction and allocating, via the circuitry, the first location to the target service.

10. The method for managing wireless communication resources according to claim 5, further comprising an admission predicating step for predicating, via the circuitry, admission rates of a future service to decide whether to adjust the current use condition of the set of resources.

11. The method for managing wireless communication resources according to claim 10, wherein the admission predicating step comprises:
- an interval adjusting step for adjusting, via the circuitry, an interval of time by which two adjacent admission prediction operations are spaced; and
- an admission rate predicating step for predicating, via the circuitry, admission rates of a future service to decide whether to adjust the set of resources under the current use condition of the set of resources.

12. A system for managing wireless communication resources, comprising:
- circuitry configured to:
  - plan, as resource planning, a set of wireless communication resources according to a status bit indicating a configuration condition of system resources;
  - determine whether a bandwidth required by a new resource allocation request can be satisfied, and if so, allow access of a service corresponding to the resource allocation request; otherwise, reject the access of the service;
  - allocate corresponding resources to the admitted service dependent upon the bandwidth demand;
  - divide the set of wireless communication resources when the status bit is at an initial status value;
  - sort the set of resources in a preset mode;
  - divide the sorted set of resources into segments, the segments comprising segments of different types and with different functions
  - further divide the segments into sections, each section being used for a corresponding type of service;
  - adjust the set of resources according to a given decision result for an adjusted admission when the status bit is at a second status value; and
  - clean up the set of resources comprehensively to reduce resource fragments when the status bit is at a third status value.

13. The resource managing system according to claim 12, wherein:
- the circuitry is further configured:
- to determine the type of the service corresponding to the resource allocation request;
- to search a corresponding segment or section for region(s) satisfying an allocation condition according to the type of the service corresponding to the resource allocation request, and to admit the service if there are region(s) satisfying the allocation condition and to reject normal admission of the service and to proceed to adjusted admission judging if there is not any region satisfying the allocation condition, wherein
- in the adjusted admission judging, the circuitry is further configured to judge whether a sufficient bandwidth can be obtained by adjusting the current allocation mode of the set of resources so as to satisfy the demand of the non-normally admitted service, and to reject adjusted admission of the service and enter a status of waiting for a next resource allocation request if such a condition is absent; and to set the status bit to the second status value and proceed to the resource planning if there is such a condition.

14. The resource managing system according to claim 13, wherein:
- for the target service for which consecutive resources are required, the circuitry is configured to sort segments in which the target service can join in a descending order of the amounts of idle resources in the sections of types to which these segments belong to thereby obtain a sorted set of segments $\Omega_1$; and for each segment in $\Omega_1$, to find and take as a first adjusted service the last service in an allocation direction of a section to which the target service belongs, and to determine the decision result for the adjusted admission, to set the status bit to the second status value and to proceed to the resource planning if the first adjusted service is removed and thereafter the target service can be accessed while all original service demands are satisfied by the set of resources adjusted for a number K−1 of times, wherein K is a natural number below or equal to a predetermined threshold $K_{max}$; and
- for the target service for which consecutive resources are not required, the circuitry is configured to divide the demands of the target service into several parts dependent upon features of the target service and then regard each part as a service for which a consecutive bandwidth is required and process each part in the same manner as the target service for which consecutive resources are required.

15. The resource managing system according to claim 12, wherein the circuitry is further configured to:
- allocate a resource to the target service when the target service is normally admitted; and allocate a resource to the target service according to the decision result for the adjusted admission when the target service is adjustment-admitted.

16. The resource managing system according to claim 15, wherein the circuitry is further configured:
   a) to search for all candidate segments in which the demand of the target service can be satisfied by an idle resource in a section corresponding to the type of the target service; b) to select among these candidate segments the segment in which the best Quality of Service, QoS, is available to the target service; c) to select the segment with the smallest amount of idle resource among the segments with the same QoS; and d) when an allocated segment and a reserved segment are candidate segments simultaneously, to preferentially select the allocated segment; and
   to allocate resources to the target service in the target segment finally selected, wherein when a resource is allocated in a section corresponding to the type of the target service in the target segment for the first time, firstly an allocation direction is selected, and then the first location at which the bandwidth demand of the target service can be satisfied is searched for in this direction and allocated to the target service.

17. The resource managing system according to claim 12, wherein the circuitry is further configured to predicate an admission rate of a future service to decide whether to adjust the current use condition of the set of resources.

18. The resource managing system according to claim 17, wherein the circuitry is further configured to:
   adjust an interval of time by which two adjacent admission prediction operations are spaced; and
   predicate an admission rate of a future service to decide whether to adjust the set of resources under the current use condition of the set of resources.

* * * * *